United States Patent Office 3,356,560
Patented Dec. 5, 1967

3,356,560
HEAT FORMABLE LAMINATED SHEET
MATERIAL
George H. Callum, South Bend, Ind., assignor to Uniroyal,
Inc., a corporation of New Jersey
No Drawing. Filed Apr. 2, 1964, Ser. No. 356,967
8 Claims. (Cl. 161—5)

ABSTRACT OF THE DISCLOSURE

A rigid heat-formable laminated sheet material having (A) a core of gum-plastic material, (B) an outer protective skin on one side which is a blend of NBR and PVC resin, and (C) a gloss-retaining outer facing layer on the other side which is a blend of (a) PVC, (b) graft of styrene and methyl methacrylate on SBR, and (c) styrene-methyl methacrylate resin.

This invention relates to a heat-formable laminated sheet material, and more particularly it relates to a laminated sheet material comprising (A) a core of gum-plastic material, (B) an outer protective skin on one side of the laminate comprising a blend of butadiene-acrylonitrile rubber and polyvinyl chloride resin, and (C) an outer facing layer of gloss-retaining and chemically resistant material on the other side of the laminate.

The invention may be regarded as an improvement particularly on laminated sheet materials such as are described in U.S. Patents 3,041,220 issued to Martin et al. on June 26, 1962, and 3,070,817 issued to Kohrn et al. on Jan. 1, 1963. Specifically, the improvement resides (1) in the provision, on one exterior surface of the laminate, of a protective surface skin (B) based on a mixture of butadiene-acrylonitrile rubber and polyvinyl chloride resin in place of the protective surface skins employed on the laminates disclosed in said prior patents, and (2) in the provision, on the other exterior surface of the laminate, of an outer facing layer (C) of gloss-retaining and chemically resistant material of the type disclosed in U.S. Patent 3,018,268, issued to Lawrence E. Daly on Jan. 23, 1962 and assigned to the United States Rubber Company.

The need for the invention arises in part from the fact that the protective skins referred to in 3,041,220 and 3,070,817 have been found not to be entirely satisfactory in certain respects under some circumstances. In particular, it has been desired to provide, on one side of the laminate, a firmly adherent outer protective skin which is harder than those available and which is more resistant to picking up dirt. The invention is based on the discovery that a firmly adherent protective skin based on a blend of butadiene-acrylonitrile rubber and polyvinyl chloride resin can be applied to the laminate conveniently and economically and such skin is not only hard and resistant to the embedment of dirt but is firmly adherent and has many other advantages which will be manifest from the detailed description hereinbelow.

The need for the invention further arises in part from the fact that it has been noted that after a period of service under adverse conditions, such as repeated washing with detergents, or repeated contact with food substances, especially those which turn rancid, the surface of a conventional gum plastic laminate tends to lose its gloss, and tends to become crazed. There is also a limit to the colored or decorative effects that can be obtained with such conventional gum plastic sheet.

Accordingly, one object of the present invention is to provide a protective surface layer on one side of a gum plastic laminate of the kind described, which surface layer retains its gloss under adverse conditions, and otherwise protects and enhances the appearance and physical properties of the underlying base sheet. Another object is to provide a way of obtaining light-colored and decorative effects on one side of a sheet construction of the kind described.

Additional objects and advantages of the invention will be made manifest in the following detailed description.

The improved laminate of the invention may be shaped at elevated temperatures, particularly with the aid of vacuum or other differential pressure, into useful articles of all sorts such as truck bodies or cabs, automotive hoods, trailer bodies, camping bodies, boat hulls, decks, luggage and the like, that are light in weight but are strong, impact-resistant, buoyant, and have other advantages.

The laminate of the present invention in its simplest form may be described as comprising (A) a relatively thick core assembly made of a gum plastic (rubber-resin composition) based on ABS (acrylonitrile, butadiene, styrene) polymeric material, (B) an exterior facing on one side comprised of a blend of butadiene-acrylonitrile rubber and vinyl resin and (C) a different exterior facing on the other side comprised of a blend of (C–a) a resinous polyvinyl halide polymer, (C–b) a graft copolymer of styrene and methyl methacrylate on a previously formed rubbery copolymer of butadiene and styrene, and (C–c) a resinous copolymer of styrene and methyl methacrylate.

The core assembly (A) preferably includes a central core member (A–1) or layer of the ABS polymer containing a blowing agent, either in the undecomposed (unexpanded) state, or in a partially decomposed state (partially blown or expanded), or in a substantially fully decomposed state, sandwiched in between thinner solid layers (A–2 and A–3) of ABS containing no blowing agent. Such solid layers (A–2, A–3) represent intermediate or sub-strate layers disposed between the central core piece (A–1) and the two different thin protective outer surface skins (B) and (C). The central core layer (A–1) and the sub-strate layers (A–2 and A–3) of gum plastic are adequately described in the U. S. Patents 3,041,220 and 3,070,817 mentioned previously. Such gum plastic based on ABS material is rigid and contains a major proportion (51 to 90 parts by weight) of resinous component and a minor proportion (correspondingly 49 to 10 parts, per 100 parts of gum plastic polymers) of rubbery component. Such ABS material may be either a physical mixture of a separately prepared resin (styrene-acrylonitrile copolymer resin containing 50 to 90% by weight of styrene and correspondingly 50 to 10% acrylonitrile) with a separately prepared rubber (butadiene-acrylonitrile copolymer rubber containing 50–85% by weight of butadiene and correspondingly 50–15% acrylonitrile), or it may be based at least in part on so-called graft copolymer in which rubber and resin are at least partially chemically combined (graft copolymer made by copolymerizing resin-forming monomers such as styrene and acrylonitrile in a previously prepared aqueous emulsion polymerizate of a rubber such as polybutadiene). Such graft copolymer may be combined with additional separately prepared styrene-acrylonitrile resin and/or butadiene acrylonitrile rubber to provide a desired over-all ratio of resinous component to rubbery component. Frequently the resulting ABS composition contains about 15–30% acrylonitrile, about 15–40% butadiene, and about 40–60% styrene, by weight, based on the entire ABS polymer as 100%. If desired the described polymers may be supplemented or replaced at least in part by equivalent polymers based for example on homologs or substitution products of the described monomers, e.g., alpha methyl styrene or dichlorostyrene in place of styrene, methacrylonitrile in place of acrylonitrile. Instead of basing the resinous portion of the gum plastic entirely on styrene-acrylonitrile resin, such resinous portion may be based on a mixture of styrene-acrylonitrile resin and a vinyl resin, such as a vinyl chloride resin, especially polyvinyl chloride or the like (in ratio of, for example, 10 parts of styrene-acrylonitrile resin to up to 10 parts of polyvinyl chloride) while preserving the previously described over-all ratio of resin to rubber. Usually it is advantageous to blend the polymers by mixing aqueous latices of the polymers and then coagulating the mixture, but the described blends may also be made by mill mixing the dry, solid polymers.

The manner in which the gum plastic materials comprising the central core member and intermediate sub-strate layers are compounded with suitable conventional compounding ingredients such as small amounts of plasticizer, antioxidant, stabilizer, and if desired vulcanizing ingredients such as sulfur and accelerator, pigments or fillers, and the like, is amply described in 3,041,220 and 3,070,817. In addition, as described in those patents, the composition for the central core (A-1) includes a blowing agent [e.g., dinitroso pentamethylene tetramine, azodicarbonamide, or p,p' - oxybis - (benzenesulfonyl hydrazide)] capable of decomposing at elevated temperature to evolve gas which causes the core member to become expanded or blown to a cellular condition. The intermediate sub-strate layers (A-2, A-3), which are solid, of course contain no blowing agent but may otherwise be compounded essentially similarly to the core composition.

Considering now the composition of one external protective skin layer (B) applied over the outer surface of one of the intermediate solid sub-strate layers superimposed on the expanded core, such skin layer (B) in accordance with the invention is comprised, as indicated, of butadiene-acrylonitrile copolymer rubber and vinyl resin. The butadiene-acrylonitrile rubber may be as described previously, while the vinyl resin is typically a vinyl chloride resin, especially polyvinyl chloride, or a copolymer based on vinyl chloride and a minor amount (49% or less) of a copolymerizable monomer such as vinyl acetate, vinylidene chloride or diethyl maleate, or a mixture of polyvinyl chloride and such copolymers may be used. The skin composition (B) may be described as consisting of 60–85% of vinyl resin and correspondingly 40–15% of butadiene-acrylonitrile rubber, by weight, based on the weight of the two polymers, as the sole essential polymers. In one important aspect, the invention contemplates preparing the skin layer (B) composition from a pre-fluxed latex blend of the butadiene-acrylonitrile resin and at least a portion of the vinyl resin. Such pre-fluxed latex blends are described in British Patent 910,807, United States Rubber Co., published Nov. 21, 1962. To prepare such pre-fluxed latex blend, an aqueous latex of butadiene-acrylonitrile rubber is blended with an aqueous latex of polyvinyl chloride or the like, typically in such proportions as to provide 70 parts of the nitrile rubber and 30 parts of the vinyl resin, in 100 parts of the two polymers. The mixed latex is then coagulated, for example by the addition of brine, and the mixed coagulum is dried and worked at an elevated temperature (e.g., 270° F. to 380° F.) sufficient to flux the blend thoroughly. Subsequently, sufficient solid polyvinyl chloride resin is added to the mix to bring the over-all proportion of vinyl resin to the desired level (for example, 37 parts of the prefluxed latex blend may be mixed with 63 parts of polyvinyl chloride resin, to bring the over-all proportions to 75 parts vinyl resin and 25 parts nitrile rubber). The mixture is again worked at elevated temperature to flux and blend it thoroughly.

A preferred feature resides in the compounding of the skin layer (B) for vulcanization or cure, preferably with a peroxide curative, particularly a di-tertiary alkyl peroxide, such as dicumyl peroxide (preferred), di-tertiary-butyl peroxide, 2,2-bis(tertiary-butylperoxy)butane, di-t-amyl peroxide, t-butyl 1-methyl-cyclohexyl peroxide, di-(3-methyl-pentynyl)-3-peroxide, 2,2-bis(t-butyl-peroxy)-propane, and the like. Other organic peroxides in general may be used such as benzoyl peroxide, acetyl peroxide, tertiary-butyl hydroperoxide, succinyl peroxide, acetyl benzoyl peroxide, etc. Less preferably, sulfur or sulfur-yielding curatives, along with conventional accelerators, may be used to cure the nitrile rubber component of the skin layer (B). When the skin (B) is thus compounded for cure of the rubbery portion of the skin composition, the skin in the final laminate is found to have remarkable hot strength, that is, the laminate can be elongated remarkably, in the process of shaping the laminate by drawing at elevated temperature, without splitting or cracking. The invention thereby makes it possible to provide even the most difficult shapes without the occurrence of undesirable surface defects.

The laminate, protected on one side by the described skin (B), is remarkable for its resistance to degradation on outdoor aging. The surface (B) is relatively hard and not easily marred, and it does not readily pick up dirt. The surface (B) readily lends itself to decoration with high gloss enamels and lacquers, and it is further particularly advantageous from the standpoint of ease of handling and processing in the factory. It is desired to emphasize that the nitrile rubber-PVC blend used in skin (B) is, by itself, without value as a skin stock as it possesses very poor hot film strength, which means that when stocks are expanded and/or vacuum formed or thermoformed using such an uncured or uncrosslinked skin, the skin splits on the surface leaving the sub-strate and core layers exposed to degradation.

This is overcome by incorporating in the skin composition (B) the necessary curing agents or crosslinking agents for the nitrile rubber portion. For this purpose the typical practice of the invention preferably uses from .5 to 5 parts of organic peroxide (preferably 1–1½ parts) or less preferably, from 0.5 to 2 parts of sulfur or sulfur-bearing compounds such as dipentamethylene thiuram tetrasulfide. Hydrogenated wood rosin may be incorporated in the skin stock formulation (B) in order to improve the bond or adhesion between the skin stock and the sub-strate material. It should also be noted that the skin formulation (B) as described is free of any liquid plasticizer, being totally plasticized by the nitrile rubber. This improves the long term aging properties as the plasticizer is not lost through volatilization, leeching, etc. Further, there is no migration of plasticizer from one layer to another, on to adjacent surfaces. However, a small amount of epoxidized soybean oil (a polymeric plasticizer) may be added in some cases to the skin (B) to act as a stabilizer for the system (0–3 parts).

By leaving out curing agents (sulfur) for the core (A-1) and sub-strate (A-2, A-3) portions of the laminate, processing of the compounds in the factory is simplified by eliminating, or at least materially reducing, the possibilities of scorching the stock. Further, as long as the core and sub-strate are not cured, they can be easily reprocessed as new core and sub-strate materials. Thus, the only layer in which a curing agent is typically used in the invention is the skin layer (B). However, it is possible, if circumstances call for it, to use sulfur cured sub-strates and/or core sections with the crosslinked nitrile rubber-vinyl resin skin composition (B).

Considering now the composition of the other external protective and decorative skin layer (C) applied over the outer surface of the other intermediate solid sub-strate layer superimposed on the expanded core, such other skin layer composition (C) is of the type described in U.S. Patent 3,018,268. In general, the other facing material (C) of the laminate is a rigid thermoplastic vinyl halide polymer composition, comprising an intimate mixture, in particular proportions, of (C-a) a resinous polyvinyl halide polymer, (C-b) a graft copolymer of monomeric styrene and monomeric methyl methacrylate on a previously formed rubbery copolymer of butadiene-1,3 and styrene, and (C-c) a resinous copolymer in specific proportions, of styrene and methyl methacrylate. The vinyl halide polymer (C-a) that is used in the other facing (C) layer includes all of the normally hard, rigid polymeric materials containing predominantly a vinyl halide, i.e., the homopolymers of vinyl halide, such as polyvinyl chloride, as well as the copolymers made from monomeric mixtures containing a vinyl halide, preferably vinyl chloride, with a lesser amount of any other copolymerizable monoethylenically unsaturated material including vinylidene halides such as vinylidene chloride, or vinyl esters such as vinyl acetate, or alpha-alkyl acrylic acids (acrylic or methacrylic), or their alkyl esters such as ethyl acrylate, methyl acrylate, octyl acrylate, methyl methacrylate or acrylonitrile, di-ethyl maleate, or the vinyl aromatic compounds such as styrene, and chlorostyrene. The vinyl halide polymers preferably used in the invention are polyvinyl chlorides or the vinyl chloride copolymers which contain, by weight, only a minor proportion (e.g., 1 to 25%) of other copolymerized monoolefinic monomers such as the copolymers of 75 to 99% vinyl chloride and 1 to 25% vinylidene chloride, or for example, 80 to 98% vinyl chloride and 2 to 20% vinyl acetate.

The resinous copolymer (C-c) of styrene and methyl methacrylate used in the other facing layer (C) may be prepared by copolymerizing 25 to 40 parts, preferably about 33 parts, of styrene with 75 to 60 parts, preferably about 67 parts, of methyl methacrylate, in solution, in mass, or in an aqueous medium by suspension, or by emulsion polymerization techniques. The preferred aqueous polymerization medium may contain one of the above mentioned colloidal or surface-active agents to obtain a suspension, or an emulsifying agent to obtain a polymer dispersion or latex. An example of a preparation of a suitable copolymer resin (C-c) is as follows:

| | Parts |
|---|---|
| Styrene monomer | 33 |
| Methyl methacrylate monomer | 67 |
| Soap ("SF flakes," a tallow soap of commerce consisting mainly of sodium stearate and sodium oleate) | 5 |
| Potassium persulfate | 0.5 |
| Mixture of dodecyl (60%), tetradecyl (20%) and hexadecyl (20%), tertiary mercaptans (referred to in the trade as "MTM-4," furnished by the Phillips Chemical Co.) | 0.05 |
| Water | 180 |

Polymerize approximately 5 hours at 50° C. to give 95–100% conversion.

The graft copolymer (C-b) used in the other facing layer (C) is preferably made of a graft of 25 to 40 parts, preferably about 33 parts, of monomeric styrene and 75–60 parts, preferably about 67 parts, of monomeric methyl methacrylate upon about 100 parts of a rubbery copolymer of about 70–85 parts of butadiene-1-3; and, correspondingly, 30–15 parts of styrene. However, the proportion of resin-forming monomers (styrene and methyl methacrylate) polymerized in the rubber to form the graft copolymer may vary from 10 to 200 parts (preferably 33 to 100 parts), per 100 parts of rubber.

The following procedure may be followed in preparing the graft copolymer component:

*Step 1.*—Preparation of rubbery copolymer latex for graft polymerization:

| | Parts |
|---|---|
| Butadiene monomer | 80 |
| Styrene monomer | 20 |
| Soap ("SF flakes") | 5 |
| Potassium hydroxide | 0.25 |
| Potassium persulfate | 0.5 |
| Mixed tertiary alkyl mercaptans ("MTM-4") | 0.05 |
| Water | 180 |

Polymerize for a sufficient length of time (e.g., 20 hours) at 50° C., as required to give 85–100% conversion (if any unreacted monomers remain, they should be stripped off).

*Step 2.*—Graft copolymerization:

| | Parts |
|---|---|
| Rubber solids (as latex produced in Step 1 above) | 100 |
| Styrene monomer | 33 |
| Methyl methacrylate monomer | 67 |
| Potassium persulfate | 0.5 |
| Mixed tertiary alkyl mercaptans ("MTM-4") | 0.5 |
| Water (total) | 300 |

Polymerize for about 3–7 hours at 50° C., as required to give a conversion of 90–100%.

The resultant latex may be coagulated to recover the graft copolymer for mill-mixing with the other components, or the latex may be used for blending with the other components in latex form, in which case the whole is coagulated after thorough mixing, and the entire mass further worked or masticated under heat and pressure to insure homogeneity.

A preferred composition for the other facing layer (C) contains, by weight, from about 70 to 98 parts of the vinyl halide polymer (C-a), and correspondingly from about 30 to 2 parts of a 55/45 blend of the graft copolymer (C-b) and the styrene-methyl methacrylate copolymer resin (C-c), or the latter two components may be incorporated with the vinyl halide separately in the same proportions. The composition may vary from 51–98 parts of the vinyl halide polymer (C-a) and correspondingly from 49–2 parts of a blend of the graft copolymer and the styrene methyl methacrylate copolymer resin [(C-b) plus (C-c)]. Further, the blend [(C-b) plus (C-c)] of the graft copolymer and the styrene-methyl methacrylate copolymer can vary from 75–25 parts of the graft copolymer and correspondingly from 25–75 parts of the styrene-methyl methacrylate copolymer.

The ingredients of the other facing layer (C) may be blended in any desired manner, preferably with working under heat and pressure at a temperature of from 280° F. to 350° F., for example in a Banbury mixer or on a roll mill. The composition may be calendered into smooth sheets of various thicknesses.

To prepare the laminate of the invention, in its simplest form, a separately calendered base sheet and separately calendered facing sheets may first be provided, followed by a laminating operation in which the sheets are pressed together at an elevated temperature (e.g., 300° F.). Adhesives are unnecessary, as the layers are firmly self-adherent when pressed together hot. Alternatively, the layers can be calendered together simultaneously from separate supplies of bulk stock in a single calendering operation. It will be understood that in order to obtain a desired thickness in a layer of any given type, such layer may in fact be made up of a plurality of calendered or otherwise formed sheets or films plied together in accordance with conventional practice. In the preferred form of the invention in which there is a core assembly made up of an expanded or expandable central core layer sandwiched in between solid intermediate layers, it will be understood that a blowing agent will be present in the central core layer. The laminating conditions (particularly the temperature) may if desired be such that the blowing agent remains substantially in the undecomposed state, that is, in the laminated sheet material as initially prepared there will in that case be substantially no expansion or blowing of the core. Subsequently, for example at the time when it is desired to shape the laminate into the desired form, for example by application of differential pressure (e.g., vacuum forming) at a temperature in excess of the softening temperature of the laminate, one may apply a temperature sufficiently elevated to cause the blowing agent to decompose. Thereupon the core layer of the laminate will expand to the desired blown condition by reason of the gaseous products released by the blowing agent. Alternatively the original lamination may be carried out under conditions such that the blowing agent will decompose in the first instance, in which case if the laminating pressure is released while the material is maintained at an elevated temperature the core will expand forthwith, to provide a blown laminate which can be shaped subsequently as desired, for example by vacuum forming. In one frequently preferred practice of the invention, the initial lamination is carried out under temperature and pressure conditions such that there may be least partial decomposition of the blowing agent but full expansion does not take place either because not all of the blowing agent has decomposed and/or because the pressure conditions and/or solubility of the gas are such that only limited expansion takes place. Such a partially expanded laminate when cooled to a temperature below the softening temperature of the laminate retains this partially expanded condition indefinitely. It may be sold as a useful article of commerce to fabricators of final articles who may subject the laminate (usually in the course of a shaping operation) to an elevated temperature such that the remainder of the expansion takes place (e.g., by decomposition of the remainder of the blowing agent, and/or by release of gas which was dissolved and/or by the expansion in size of minute bubbles of gas already in the core layer).

It is desired to make particular reference to an important advantage of the second facing layer (C). Although this layer may be made opaque or colored by the addition of suitable pigments or dyes or the like, it is a remarkable advantage of this layer that it is basically transparent or translucent. This property makes possible the preparation of laminates which embody various interesting and highly desirable surface decorations or effects. In the first place, the substantially transparent nature of the surface material (C) makes it much more suitable for coloring, especially with light colors, than the essentially inherently opaque materials of the remainder of the laminate. Thus, the use of the surface layer composition (C) opens up new color possibilities that could not be achieved with the other compositions of the laminate alone. Further, a desired design or pattern may be applied to the undersurface of the facing layer (C), using for example suitable colored inks (e.g. vinyl based inks), by any appropriate method such as reverse printing, so that when the surface layer is subsequently applied to the base assembly, the desired colored design is sandwiched in between the base assembly and the transparent surface layer, and can be seen clearly, while being protected from wear. Wood grain effects, or other similar decoration, may be achieved in this manner. The surface of the laminate of the invention has greatly improved hardness and scratch resistance, in comparison to the uncovered base laminate. Greatly improved chemical resistance is also imparted by the surface layer (C), with the result that the laminate is very valuable for many uses, such as for making refrigerators or refrigerator parts, which are subject to crazing if made of ordinary plastics. Thus, butter, or oils, or other foods, especially those which tend to become rancid, have a relatively rapid deteriorating effect on the usual plastics, but the present laminate is essentially immune to such deterioration. The material of the base layer rapidly loses its gloss and becomes crazed under such adverse conditions, such as repeated washing in water containing soaps and detergents, but the laminate bearing the described surface layer remains glossy and pleasing for long periods of time under these adverse conditions. The surface (C) of the present laminate will not support combustion, unlike the base material, and therefore the laminate is safe to use under conditions where exposure to flame or hot objects is a possibility. The laminate has excellent drawing qualities, and may be vacuum formed or contour molded with ease when heated, since the surface layer (C) in no way detracts from the excellent properties of the base material in this respect. The laminate provides a combination of properties, notably exceptionable toughness, and permanent glossy surface, high heat distortion properties, flame resistance and good forming qualities, which would not be provided either by the base material alone, or the surface material (C) alone. The heat distortion temperature of the laminate is significantly higher than the heat distortion temperature of the usual vinyl plastics, because of the supporting effect provided by the base layer. The laminate is therefore especially useful for such articles as vacuum sweeper covers, steam radiator covers, refrigerator cabinets and door liners, food containers, and the like. The material retains its gloss on the surface (C) even after being repeatedly washed with detergents, soaps and most common household solvents. Because of the chemical resistance of the surface (C), the laminate is useful for making acid resistant containers and for duct work in chemical plants.

The following examples, in which all parts are expressed by weight unless otherwise indicated, will serve to illustrate the compositions employed in the laminate of the invention in more detail.

EXAMPLE I

*Expanded core (A–1)*

| Ingredients: | Parts |
|---|---|
| Butadiene-acrylonitrile rubber (32% acrylonitrile) | 34 |
| Styrene-acrylonitrile resin (70% styrene, 30% acrylonitrile) | 63 |
| Polyvinyl chloride resin | 3 |
| Diphenyl phthalate (processing aid and solid plasticizer) | 5 |
| Azodicarbonamide (blowing agent, Celogen AZ) | 2 |
| Zinc oxide (activator) | 1.5 |

EXAMPLE II (A–2, A–3)

*Solid sub-strate*

| Ingredients: | Parts |
|---|---|
| Styrene-acrylonitrile resin (30% styrene) | 59.5 |
| Butadiene-acrylonitrile rubber (32% acrylonitrile) | 25.5 |
| Polyvinyl chloride resin | 15 |
| Epoxidized soybean oil (plasticizer) | 2 |
| Barium-cadmium laurate | .3 |

EXAMPLE III

*Curable skin (B)—1st stage mix*

| Ingredients: | Parts |
|---|---|
| Pre-fluxed latex blend of butadiene-acrylonitrile rubber (70) and polyvinyl chloride resin (30) | 100 |
| Mixture of mono and di octylated diphenyl amines | 1.5 |
| Di-tertiary-butyl-para-cresol | 1.0 |
| Barium-cadmium laurate | 2.5 |

The above first stage mix may be mixed in a Banbury mixer, the maximum allowable temperature being about 310° F.

*2nd stage mix*

| Ingredients: | Parts |
|---|---|
| Polyvinyl chloride resin | 64.3 |
| Product of above 1st stage mix | 37.5 |
| Di-tertiary-butyl-para-cresol | 1.1 |
| Titanium dioxide | 30.0 |
| Hydrogenated rosin | 1.5 |
| Dicumyl peroxide (40%) | 1.0 |

In the second stage mix, the various ingredients except for the dicumyl peroxide may be mixed on a mill at a temperature up to about 350° F. and the mix may be transferred to a cool mill for addition of the dicumyl peroxide (maximum stock temperature about 250° F.).

EXAMPLE IV

*Surface layer (C)*

The following Table I includes compositions of typical formulations for the facing or surface layer (C). Stocks 1, 2 and 7 are not facing layer formulations for use in the invention, but are listed for purposes of comparison. Stocks 3, 4, 5 and 6 represent compositions suitable for the facing layer (C) of the laminate of the invention. It is desired to emphasize that stocks 3, 4, 5 and 6 provide remarkably improved gloss retention, after 30 days at 120° F. in contact with rancid butter and strong soapy water. The graft copolymer used in stocks 3, 4, 5 and 6 is a graft of 100 parts of styrene and methyl methacrylate (33:67) on 100 parts of butadiene-styrene (80–20) rubber in latex form, prepared as described above.

| Ingredients: | Parts by weight |
|---|---|
| Polyvinyl chloride resin | 75 |
| Tetrahydrofurane | 230 |
| Toluene | 80 |
| Methyl ethyl ketone | 350 |
| Stabilizer (e.g. barium-cadmium stearate) | 1.2 |

Pigments as desired are added to the foregoing; for example to print a black design a masterbatch of 2 parts of carbon black in 18 parts of dioctyl phthalate may be added to the above formulation. To accentuate the design,

TABLE I.—SURFACE LAYER (C)

| | Stock | | | | | | |
|---|---|---|---|---|---|---|---|
| | 1 | 2 | 3 | 4 | 5 | 6 | 7 |
| Polyvinyl chloride (Geon 103) | 100 | | 100 | | 100 | | |
| Vinyl chloride copolymer (vinyl chloride 95 parts/vinyl acetate 5 parts) | | 100 | | 100 | | 100 | |
| Blend of 55 parts of graft copolymer of styrene/methyl methacrylate on butadiene/styrene and 45 parts styrene/methyl methacrylate (33/67) resin | | | 10 | 10 | 20 | 20 | 100 |
| Tin mercaptide stabilizer (Thermolite 31) | 3 | 3 | 3 | 3 | 3 | 3 | |
| Physical Properties: | | | | | | | |
| Rockwell Hardness ("R" Scale) | 116 | 115 | 114 | 112 | 110 | 108 | 64 |
| Scratch Resistance (Tabor Abrasion Method) | 528 | 486 | 501 | 488 | 480 | 476 | 268 |
| Gloss retention after 30 days at 120° F. in contact with: | | | | | | | |
| (1) Rancid | Fair | Fair | Good | Good | Good | Good | Fair |
| (2) Strong soapy water | Fair | Fair | Good | Good | Good | Good | Fair |
| Vacuum Molding Properties | Poor | Poor | Good | Good | Good | Good | Good |
| Heat Distortion, ° F. (ASTM D–648–45T) | 158 | 157 | 160 | 160 | 158 | 157 | 160 |
| Notched Charpy Impact (ft.-lbs./in. Notch) | 5.1 | 5.5 | 7.8 | 7.7 | 8.1 | 8.3 | 7.1 |

EXAMPLE V

The following layers (formulations as given in above examples) are superimposed, in order, on the surface of a vacuum table:

(1) Wax paper (to prevent sticking).
(2) One calendered sheet of skin stock (B) .025 inch thick.
(3) Two sheets of substrate stock (A–2) each .025 inch thick.
(4) Two sheets of expandable core stock (A–1) each .025 inch thick.
(5) Two sheets of substrate stock (A–2) each .025 inch thick.
(6) One sheet glossy skin stock (C) .025 inch thick.
(7) Wax paper.

Drape a rubber sheet over all layers to form a closed chamber with the vacuum table. Apply suction for 15 minutes. Place assembly in a vulcanizer, suction still applied, and bring to a pressure of 60 p.s.i. and a temperature of 307° F. over a 20 minute period. Maintain for 75 minutes. Cool down for 70 minutes at 40 p.s.i. and remove from vulcanizer. The laminate is only partially expanded (either because the blowing agent has not completely decomposed and/or because some of the gas remains dissolved in the plastic). The laminate can be sold in this form as a heat-formable sheet material suitable for numerous uses. In the process of subsequent heat forming, at a temperature of, e.g., 285–300° F., the laminate, or more particularly the central core thereof, will expand completely (either because of complete decomposition of the blowing agent at that time, and/or because previously generated but dissolved gas is released from solution in the plastic, and/or because gas bubbles already present become enlarged when heated).

In making decorated laminate (decoration interposed between the glossy skin layer C and the substrate layer A–3, but visible because the skin layer C is transparent) a desired design may be printed or otherwise applied to the underside of the glossy skin layer (C) prior to lamination using an ink or printing formulation for example as follows:

it may be overprinted with a background color (or such background color may be applied over or may be contained in the substrate layer A–3), formulated for example as follows:

| Ingredients: | Parts by weight |
|---|---|
| Diisobutyl ketone | 40 |
| Colored pigment | 20 |
| Polyvinyl chloride resin | 30 |
| Dioctyl phthalate | 10 |

The solvents are of course allowed to evaporate from these colored compositions before the layers are laminated together.

Having thus described my invention, what I claim and desire to protect by Letters Patent is:

1. A rigid, heat formable laminated sheet material comprising a core sheet (A) of rigid gum plastic material which is a blend of from 51 to 90 parts of resin and correspondingly from 49 to 10 parts of butadiene-acrylonitrile rubber, the said resin being selected from the group consisting of styrene-acrylonitrile resin and mixtures of styrene-acrylonitrile resin with polyvinyl chloride resin, an outer protective skin (B) of flexible, adherent material overlying one outer surface of said laminate, said skin being a composition comprising 60 to 85% of polyvinyl chloride resin and correspondingly 40 to 15% of butadiene-acrylonitrile rubber, the said butadiene-acrylonitrile rubber in the skin being cured, and a glossy surface layer (C) overlying and integrally united to the remaining surface of the laminate comprising a homogeneous mixture of 51% to 98% of (C–a) a resinous vinyl chloride polymer and correspondingly 49% to 2% of (C–b) a graft copolymer of from 10 to 200 parts of a mixture of styrene and methyl methacrylate in ratio of from 25:75 to 40:60 graft copolymerized upon 100 parts of a rubbery copolymer, in aqueous emulsion form, of butadiene and styrene in ratio of from 70:30 to 85:15 and (C–c) a resinous copolymer of styrene and methyl methacrylate in ratio of from 25:75 to 40:60, the amounts of (C–b) and (C–c) ranging from 75 to 25 parts of (C–b) and correspondingly from 25 to 75 parts of (C–c) per 100 parts of (C–b) plus (C–c), the said percentages, ratios and parts being by weight.

2. A rigid, heat formable laminated sheet material comprising a core sheet (A) of rigid cellular gum plastic material which is a blend of from 51 to 90 parts of resin and correspondingly from 49 to 10 parts of butadiene-acrylonitrile rubber, the said resin being selected from the group consisting of styrene-acrylonitrile resin and mixtures of styrene-acrylonitrile resin with polyvinyl chloride resin, an outer protective skin (B) of flexible, adherent material overlying one outer surface of said laminate, said skin being a composition comprising 60 to 85% of polyvinyl chloride resin and correspondingly 40 to 15% of butadiene-acrylonitrile rubber, the said butadiene-acrylonitrile rubber in the skin being cured, and a glossy surface layer (C) overlying and integrally united to the remaining surface of the laminate comprising a homogeneous mixture of 51% to 98% of (C–a) a resinous vinyl chloride polymer and correspondingly 49% to 2% of (C–b) a graft copolymer of from 10 to 200 parts of a mixture of styrene and methyl methacrylate in ratio of from 25:75 to 40:60 graft copolymerized upon 100 parts of a rubbery copolymer, in aqueous emulsion form, of butadiene and styrene in ratio of from 70:30 to 85:15 and (C–c) a resinous copolymer of styrene and methyl methacrylate in ratio of from 25:75 to 40:60, the amounts of (C–b) and (C–c) ranging from 75 to 25 parts of (C–b) and corresponding from 25 to 75 parts of (C–c) per 100 parts of (C–b) plus (C–c), the said percentages, ratios and parts being by weight.

3. A laminate as in claim 2, in which the butadiene-acrylonitrile rubber in the skin (B) is cured with an organic peroxide.

4. A rigid, heat-formable laminated structural material comprising an expanded core layer (A–1), solid sub-strate layers (A–2) and (A–3) on each face of said core layer, said core and sub-strate layers comprising a gum plastic composition selected from the group consisting of
    (a) physical mixtures of butadiene-acrylonitrile rubber and a resin selected from the group consisting of styrene-acrylonitrile resin and mixtures of styrene-acrylonitrile resin with polyvinyl chloride resin,
    (b) graft copolymers of styrene and acrylonitrile on polybutadiene, and
    (c) mixtures of (b) with resin selected from the group consisting of styrene-acrylonitrile resin and mixtures of styrene-acrylonitrile resin with polyvinyl chloride resin,
a protective skin layer (B) on the outer surface of one of said sub-strate layers, the said skin layer (B) comprising a mixture of 60 to 85% of polyvinyl chloride resin and correspondingly 40 to 15% of butadiene-acrylonitrile rubber, the said butadiene-acrylonitrile rubber in the said skin being cured, and a glossy skin layer (C) on the outer surface of the other said sub-strate layer, the said glossy layer (C) comprising a homogeneous mixture of 51% to 98% of (C–a) a resinous vinyl chloride polymer and correspondingly 49% to 2% of (C–b) a graft copolymer of from 10 to 200 parts of a mixture of styrene and methyl methacrylate in ratio of from 25:75 to 40:60 graft copolymerized upon 100 parts of a rubbery copolymer, in aqueous emulsion form, of butadiene and styrene in ratio of from 70:30 to 85:15 and (C–c) a resinous copolymer of styrene and methyl methacrylate in ratio of from 25:75 to 40:60, the amounts of (C–b) and (C–c) ranging from 75 to 25 parts of (C–b) and correspondingly from 25 to 75 parts of (C–c) per 100 parts of (C–b) plus (C–c), the said percentages, ratios and parts being by weight.

5. A rigid, heat-formable laminated structural material comprising a core layer (A–1) containing a blowing agent, solid sub-strate layers (A–2) and (A–3) on each face of said core layer, said core and sub-strate layers comprising a gum plastic composition selected from the group consisting of
    (a) physical mixtures of butadiene-acrylonitrile rubber and a resin selected from the group consisting of styrene-acrylonitrile resin and mixtures of styrene-acrylonitrile resin with polyvinyl chloride resin,
    (b) graft copolymers of styrene and acrylonitrile on polybutadiene, and
    (c) mixtures of (b) with resin selected from the group consisting of styrene-acrylonitrile resin and mixtures of styrene-acrylonitrile resin with polyvinyl chloride resin,
a protective skin layer (B) on the outer surface of one of said sub-strate layers, the said skin layer (B) comprising a mixture of 60 to 85% of polyvinyl chloride resin and correspondingly 40 to 15% of butadiene-acrylonitrile rubber, the said butadiene-acrylonitrile rubber is the said skin being cured, and a glossy skin layer (C) on the outer surface of the other said sub-strate layer, the said glossy layer (C) comprising a homogeneous mixture of 51% to 98% of (C–a) a resinous vinyl chloride polymer and correspondingly 49% to 2% of (C–b) a graft copolymer of from 10 to 200 parts of a mixture of styrene and methyl methacrylate in ratio of from 25:75 to 40:60 graft copolymerized upon 100 parts of a rubber copolymer, in aqueous emulsion form, of butadiene and styrene in ratio of from 70:30 to 85:15 and (C–c) a resinous copolymer of styrene and methyl methacrylate in ratio of from 25:75 to 40:60, the amounts of (C–b) and (C–c) ranging from 75 to 25 parts of (C–b) and correspondingly from 25 to 75 parts of (C–c) per 100 parts of (C–b) plus (C–c), the said percentages, ratios and parts being by weight.

6. A laminate as in claim 5 in which the said core layer (A–1) is only partially expanded.

7. A laminate as in claim 5 in which the said blowing agent is completely decomposed and the said core layer (A–1) is completely expanded.

8. A laminate as in claim 5 in which the said glossy skin layer (C) is transparent and bears a design on its surface in contact with the adjacent sub-strate.

References Cited

UNITED STATES PATENTS

| | | | |
|---|---|---|---|
| 3,018,268 | 1/1962 | Daley | 260—45.5 |
| 3,041,220 | 6/1962 | Martin et al. | 161—253 |
| 3,070,817 | 1/1963 | Kohrn et al. | 161—161 |

MORRIS SUSSMAN, *Primary Examiner.*